United States Patent
Rozsa et al.

(10) Patent No.: US 10,251,369 B1
(45) Date of Patent: Apr. 9, 2019

(54) PET CARRYING CASE (71) Applicants: Joseph Rozsa, Raleigh, NC (US);
Casey Brucken, Raleigh, NC (US)

(72) Inventors: Joseph Rozsa, Raleigh, NC (US);
Casey Brucken, Raleigh, NC (US)

(*) Notice: Subject to any disclaimer, the term of this patent is extended or adjusted under 35 U.S.C. 154(b) by 289 days.

(21) Appl. No.: 15/290,057

(22) Filed: Oct. 11, 2016

(51) Int. Cl.
A01K 1/02 (2006.01)
A45C 3/00 (2006.01)
A45C 13/10 (2006.01)
A45C 13/00 (2006.01)
A45C 13/30 (2006.01)

(52) U.S. Cl.
CPC .............. *A01K 1/029* (2013.01); *A45C 3/001* (2013.01); *A45C 13/001* (2013.01); *A45C 13/10* (2013.01); *A45C 13/30* (2013.01); *A45C 2003/008* (2013.01)

(58) Field of Classification Search
CPC .... A01K 1/029; A01K 1/0254; A45C 13/001; A45C 3/00
See application file for complete search history.

(56) References Cited

U.S. PATENT DOCUMENTS

| | | | |
|---|---|---|---|
| 4,119,181 A | 10/1978 | Jones | |
| 4,334,601 A * | 6/1982 | Davis | A45C 3/00 190/111 |
| 4,773,515 A | 9/1988 | Kotkins, Jr. | |
| 5,265,719 A | 11/1993 | Wand | |
| 5,374,073 A * | 12/1994 | Hung-Hsin | A45C 5/14 16/113.1 |
| D388,251 S | 12/1997 | Smith | |
| 5,755,180 A * | 5/1998 | Smith | A01K 13/00 119/165 |
| D405,265 S | 2/1999 | Chapelson | |
| 5,957,349 A * | 9/1999 | Krulik | A45C 9/00 190/8 |
| 6,296,165 B1 * | 10/2001 | Mears | A45C 3/00 150/107 |
| 6,516,745 B1 | 2/2003 | Spires | |
| 7,140,507 B2 * | 11/2006 | Maldonado | A45C 11/20 220/592.2 |
| 7,162,890 B2 * | 1/2007 | Mogil | A45C 11/20 62/457.7 |
| 7,669,436 B2 * | 3/2010 | Mogil | A45C 11/20 62/457.7 |
| 8,182,030 B1 * | 5/2012 | Britten | A47D 13/025 297/118 |

(Continued)

*Primary Examiner* — Magdalena Topolski (57) ABSTRACT

The pet carrying case is luggage adapted for use with pets. The pet carrying case is subdivided into a plurality of compartments and a plurality of dispensers that are used to organize the provisions, supplies, and equipment necessary for the care of the domestic animal during travel. The pet carrying case comprises a plurality of compartments, a plurality of dispensers, one or more bungees, a document envelope, a picture frame, a plurality of fasteners, a plurality of D rings, a handle, and a strap. The plurality of fasteners are used to open and close the plurality of compartments. The plurality of dispensers, the one or more bungees, the document envelope, the plurality of fasteners, the plurality of D rings, the handle, and the strap are attached to the exterior of the plurality of compartments. The picture frame is mounted within a compartment selected from the plurality of compartments.

14 Claims, 6 Drawing Sheets

(56) References Cited

U.S. PATENT DOCUMENTS

| | | | |
|---|---|---|---|
| 2003/0024960 A1* | 2/2003 | Greenstein | A45C 11/20 224/153 |
| 2003/0116243 A1* | 6/2003 | Cooper | A45C 3/06 150/112 |
| 2005/0211175 A1 | 9/2005 | Johnson | |
| 2006/0039227 A1* | 2/2006 | Lai | G11C 7/1042 365/230.03 |
| 2006/0118376 A1* | 6/2006 | Godshaw | A01K 1/0254 190/107 |
| 2007/0022969 A1* | 2/2007 | Godshaw | A01K 1/0254 119/497 |
| 2012/0234246 A1 | 9/2012 | Spence | |
| 2014/0102008 A1* | 4/2014 | Mastrosimone-Gese | B65D 43/02 49/394 |
| 2014/0144437 A1* | 5/2014 | Miller | A45C 3/00 128/203.12 |
| 2015/0083537 A1* | 3/2015 | Ranly | A45C 13/02 190/111 |
| 2015/0265020 A1* | 9/2015 | McCue | A45C 3/00 206/216 |
| 2016/0113365 A1* | 4/2016 | Lank | A45C 3/00 383/40 |
| 2018/0220759 A1* | 8/2018 | Johnson | A45C 3/00 |

\* cited by examiner

PET CARRYING CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including purses, handbags, and luggage, more specifically, flexible luggage specifically combined with items adapted for use in animal husbandry.

Summary of Invention

The pet carrying case is an item of luggage. The pet carrying case is adapted for use with accessories for domestic animals, especially pets. The pet carrying case stores the provisions, supplies, and equipment necessary for the care of the domestic animal during travel. The pet carrying case comprises a combination of textiles and sheetings. The pet carrying case is subdivided into a plurality of compartments and a plurality of dispensers that are used to organize the provisions, supplies, and equipment necessary for the care of the domestic animal during travel.

These together with additional objects, features and advantages of the pet carrying case will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet carrying case in detail, it is to be understood that the pet carrying case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet carrying case.

It is therefore important that the claims be regarded as including such equivalent construction insofar as they do not depart from the spirit and scope of the pet carrying case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 10.

The pet carrying case 100 (hereinafter invention) comprises a plurality of compartments 101, a plurality of dispensers 102, one or more bungees 103, a document envelope 104, a picture frame 105, a plurality of fasteners 106, a plurality of D rings 107, a handle 108, and a strap 109. The plurality of fasteners 106 are used to open and close the plurality of compartments 101. The plurality of dispensers 102, the one or more bungees 103, the document envelope 104, the plurality of fasteners 106, the plurality of D rings 107, the handle 108, and the strap 109 are attached to the exterior of the plurality of compartments 101. The picture frame 105 is mounted within a compartment selected from the plurality of compartments 101. The invention 100 is an item of luggage. The invention 100 is adapted for use with the provisions, the supplies, and the equipment associated with domestic animals, especially pets. The invention 100 stores the provisions, the supplies, and the equipment necessary for the care of the domestic animal during travel. The invention 100 comprises a combination of textiles 191 and sheetings 192. The invention 100 is subdivided into a plurality of compartments 101 and a plurality of dispensers 102 that are used to organize the provisions, the supplies, and the equipment necessary for the care of the domestic animal during travel.

The invention 100 is further defined with a bottom side 171, a top side 172, a food side 173, a document side 174, a bed side 175, and an accessory side 176. The bottom side 171 is the side of the invention 100 that is placed on a supporting surface during normal use such that the plurality of compartments 101 are accessible. The top side 172 is the side of the invention 100 that is distal from the bottom side 171. When viewed from the top side 172, the remaining sides are, in clockwise order, the food side 173, the document side 174, the bed side 175, and the accessory side 176. Each side is named for a compartment selected from the plurality of compartments 101 that is accessible from the named side. The location and function of each of the plurality of compartments 101 is discussed in greater detail elsewhere in this disclosure. The plurality of fasteners 106 comprises a first fastener 161, a second fastener 162, a third fastener 163, a fourth fastener 164, a fifth fastener 165, a sixth fastener 166, a seventh fastener 167, and an eighth fastener 168. The plurality of fasteners 106 are described in individual detail throughout this disclosure.

Each of the plurality of compartments 101 is a pocket that is used to store selected provisions, supplies, or equipment necessary for the care of the domestic animal. Each of the plurality of compartments 101 are positioned and attached to each other such that in total the plurality of compartments 101 forms the unified item of luggage that is the invention 100. Methods to form a plurality of compartments 101 into a unified item or luggage, or equivalently a single piece of luggage into a plurality of compartments 101, are well known and documented in the textile arts. The walls of the plurality of compartments 101 comprises a plurality of textiles 191 and a plurality of composite textiles 190. Each of the plurality of composite textiles 190 comprises a two layer composite textile 190 that is formed from textile 191 and a plastic sheeting 192. Methods to form layered composite textiles 190 are well known and documented in the textile arts. Each of the plurality of compartments 101 is formed from the combination of composite textiles 190 and textiles 191 in such a manner that the exterior surfaces of the invention 100 are formed from a textile 191 while the interior surfaces of the invention 100 are formed from a plastic sheeting 192.

The plurality of compartments 101 comprises a master compartment 111, a bed compartment 112, a food storage compartment 113, a tray compartment 114, and an accessory compartment 115. The master compartment 111 further comprises a master compartment flap 121 and a first fastener 161. The bed compartment 112 further comprises a bed compartment flap 122 and a second fastener 162. The food storage compartment 113 further comprises a food storage compartment flap 123 and a third fastener 163. The tray compartment 114 further comprises a tray compartment door 124 and a fourth fastener 164. The accessory compartment 115 further comprises an accessory compartment flap and a fifth fastener 165.

The master compartment 111 is a general storage compartment that is accessed through the top side 172 of the invention 100. The master compartment flap 121 is a first three sided cut that forms a first aperture through the exterior of the invention 100. Access to the master compartment 111 is gained through the master compartment flap 121. The master compartment flap 121 is secured to the master compartment 111 using the first fastener 161 in a fashion that closes access to the master compartment 111.

The bed compartment 112 is a storage compartment that is adapted for use with bedding 201. As shown most clearly in FIGS. 4 and 5, the bedding 201 is a readily and commercially available pet bedding 201 that is further modified with a ninth fastener 169. The ninth fastener 169 is used to securely fold the bedding 201 in half such that the bedding 201 can be inserted into the bed compartment 112. The bed compartment 112 is accessed through the bed side 175 of the invention 100 and is positioned proximal to the bottom side 171 of the invention 100. The bed compartment flap 122 is a second three sided cut that forms a second aperture through the exterior of the invention 100 through which the bedding 201 can be inserted. Access to the bed compartment 112 is gained through the bed compartment flap 122. The bed compartment flap 122 is secured to the bed compartment 112 using the second fastener 162 in a fashion that closes access to the bed compartment 112.

The food storage compartment 113 is a storage compartment that adapted for use with pet food 202 and water 203. In the first potential embodiment of the disclosure, as shown most clearly in FIG. 3, the pet food 202 and water 203 are stored in separate containers. In alternate embodiments of the disclosure, the pet food 202 can be stored loose within the food storage compartment 113 while the water 203 can be stored in a container attached to the invention 100 using a bungee selected from the one or more bungees 103. The food storage compartment 113 is accessed through the food side 173 of the invention 100. The food storage compartment flap 123 is a third three sided cut that forms a third aperture through the exterior of the invention 100. Access to the food storage compartment 113 is gained through the food storage compartment flap 123. The food storage compartment flap 123 is secured to the food storage compartment 113 using the third fastener 163 in a fashion that closes access to the food storage compartment 113.

The tray compartment 114 is a storage compartment that adapted for use in storing and presenting bowls for use by the domestic animal. The tray compartment 114 is accessed through the bed side 175 of the invention 100. The tray compartment door 124 is a fourth three-sided cut that forms a fourth aperture through the exterior of the invention 100. Access to the tray compartment 114 is gained through the tray compartment door 124. The tray compartment door 124 is secured to the tray compartment 114 using the fourth fastener 164 in a fashion that closes access to the tray compartment 114.

The tray compartment door 124 further comprises a first bowl aperture 211, a second bowl aperture 212, a reinforcing plate 213 and a supporting strut 214. The tray compartment door 124 is designed to provide a supporting surface for a plurality of bowls 204 that are used to feed and water the domestic animal. The reinforcing plate 213 is a molded plastic plate that is used to reinforce the flap formed by the fourth three-sided cut. The reinforcing plate 213 has formed in it the first bowl aperture 211 and the second bowl aperture 212. The first bowl aperture 211 is sized to receive a first bowl selected from the plurality of bowls 204. The second bowl aperture 212 is sized to receive a second bowl selected from the plurality of bowls 204. The reinforcing plate 213 is attached to the fourth flap such that the reinforcing plate 213 will form a horizontal surface when the tray compartment door 124 is opened. Optionally, excess material may be removed from the fourth flap such that each of the plurality of bowls 204 will pass through both the reinforcing plate 213 and the fourth flap when the bowls are presented for use by the domestic animal. The tray compartment door 124 is held in a horizontal position by the supporting strut 214. The supporting strut 214 is a plastic trapezoidal structure that is mounted on the exterior surface of the tray compartment door 124 such that when the tray compartment door 124 is opened to the horizontal position the supporting strut 214 will swing perpendicular to the tray compartment door 124. The supporting strut 214 is used as a support leg to maintain the tray compartment door 124 in the horizontal position.

The accessory compartment 115 is a storage compartment that is adapted for use with treats and other equipment or supplies. The accessory compartment 115 is accessed through the accessory side 176 of the invention 100. The accessory compartment flap 125 is a fifth three-sided cut that forms a fifth aperture through the exterior of the invention 100. Access to the accessory compartment 115 is gained through the accessory compartment flap 125. The accessory compartment flap 125 is secured to the accessory compartment 115 using the fifth fastener 165 in a fashion that closes access to the accessory compartment 115.

The plurality of dispensers 102 comprises a first sheet dispenser 131 and a second sheet dispenser 132. The first sheet dispenser 131 comprises a first textile 215 and the seventh fastener 167. The first textile 215 is attached to the document side 174 of the invention 100 using a first plurality of sewn seams in such a manner that a first pocket is formed. The first pocket is opened and closed using the seventh fastener 167. The first textile 215 has further formed in it a sixth aperture 218. The first sheet dispenser 131 is sized to store and dispense through the sixth aperture 218 one or more wet wipes for cleaning purposes. The second sheet dispenser 132 comprises a second textile 216 and the eighth fastener 168. The second textile 216 is attached to the document side 174 of the invention 100 using a second plurality of sewn seams in such a manner that a second pocket is formed. The second pocket is opened and closed using the eighth fastener 168. The second textile 216 has further formed in it a seventh aperture 219. The second sheet dispenser 132 is sized to store and dispense through the seventh aperture 219 one or more plastic bags for the purpose of collecting solid waste. Methods to form pockets on luggage are well known and documented in the textile arts.

The document envelope 104 comprises a third textile 217 and the sixth fastener 166. The third textile 217 is attached to the document side 174 of the invention 100 using a third plurality of sewn seams in such a manner that a third pocket is formed. The third pocket is opened and closed using the sixth fastener 166. The document envelope 104 is sized to store any travel documents that may be required by the domestic animal. Methods to form pockets on luggage are well known and documented in the textile arts.

The picture frame 105 is a transparent pocket formed on the interior surface of the master compartment 111 from a transparent plastic sheeting 192. The purpose of the picture frame 105 is to store pictures of the domestic animal associated with the invention 100. The purpose of storing such pictures is to assist in the recovery of the domestic animal should the domestic animal become lost. Methods to form pockets on luggage are well known and documented in the textile arts.

The plurality of D rings 107 comprises a first D ring 151 and a second D ring 152. The first D ring 151 is a structural loop that is attached to the food side 173 of the invention 100. The second D ring 152 is a structural loop that is attached to the bed side 175 of the invention 100. The purpose of the first D ring 151 and the second D ring 152 is to provide attachment points for the strap 109.

The strap 109 is an apparatus that: 1) attaches to the invention 100 to allow the invention 100 to be carried on the shoulder; and, 2) is used as a tether for control of the domestic animal. The strap 109 comprises a webbing 180, a first clip 181, a second clip 182, a hand loop 183 and a shoulder pad 184. In the first potential embodiment of the disclosure, the webbing 180 provides the structure for the strap 109. The first clip 181 attaches to a first end of the webbing 180. The hand loop 183 is formed in the end of the webbing 180 that is distal from the first end of the webbing 180. The hand loop 183 is used to control the strap 109 while the strap 109 is used to tether the domestic animal. The second clip 182 is a carabiner.

The shoulder pad 184 is a padded rectangular textile that is wrapped around the webbing 180 to protect the shoulder while being carried. Methods to form the strap 109 as described in this paragraph are well known and documented in the textile arts.

Figure 1:
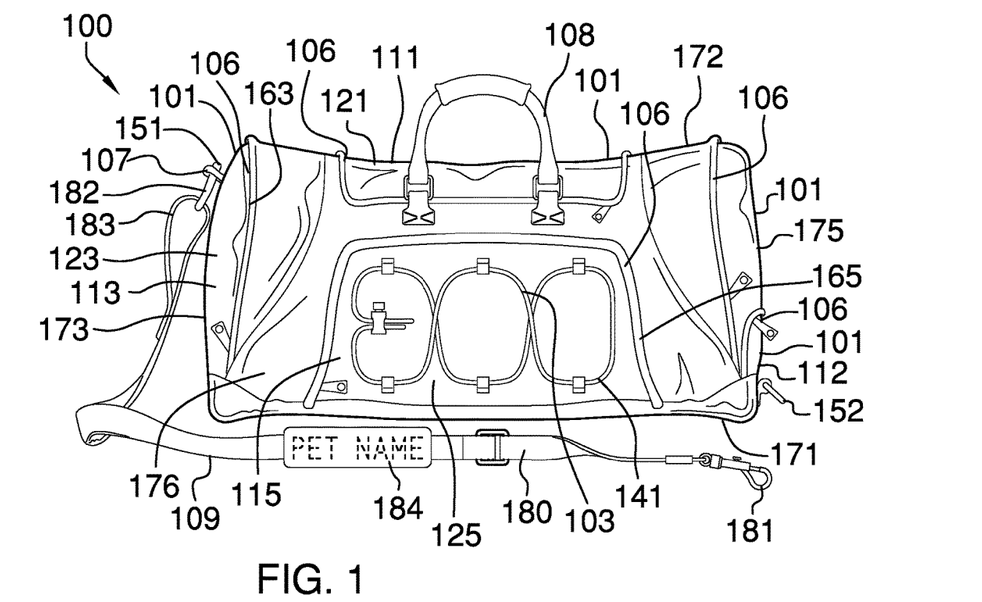
FIG. 1 is a front view of an embodiment of the disclosure.
Figure 2:
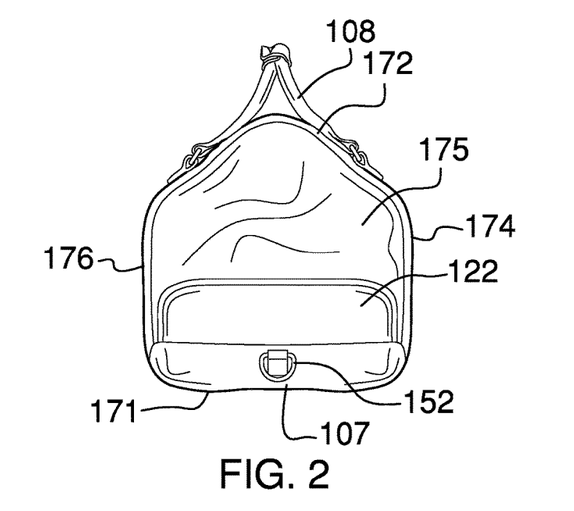
FIG. 2 is a side view of an embodiment of the disclosure.
Figure 3:
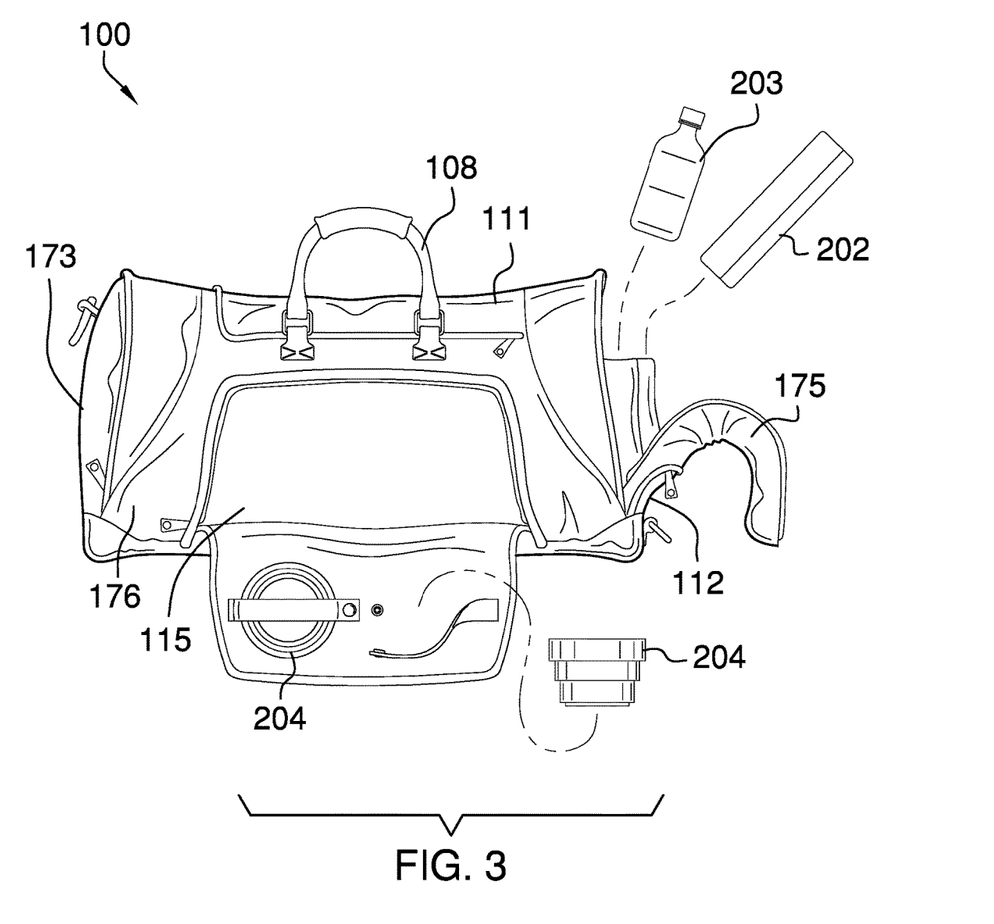
FIG. 3 is an exploded view of an embodiment of the disclosure.
Figure 4:
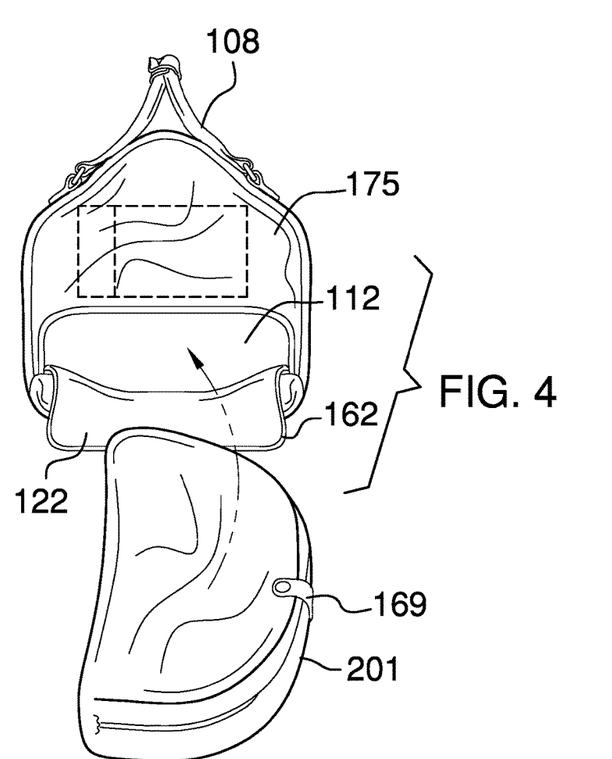
FIG. 4 is a side view of an embodiment of the disclosure.
Figure 5:
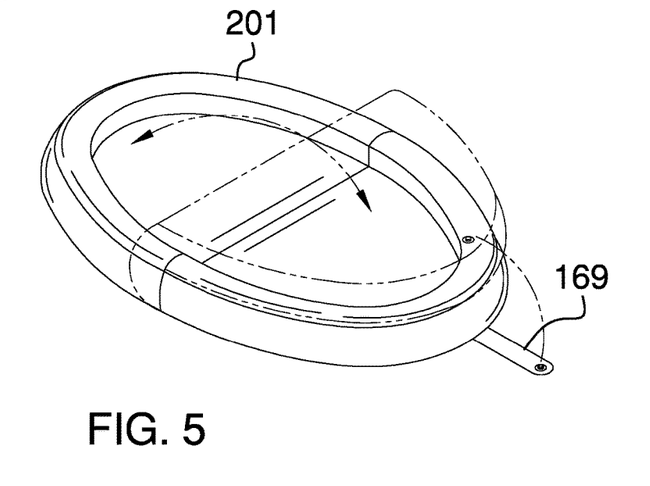
FIG. 5 is a detail view of an embodiment of the disclosure.

In the first potential embodiment of the disclosure, as shown in FIG. 1, the second clip 182 attaches the hand loop 183 of the strap 109 to the first D ring 151. The first clip 181 attaches the first end of the webbing 180 to the second D ring 152.

The one or more bungees 103 comprises a first bungee 141. As shown in FIG. 1, the first bungee 141 is attached to the accessory compartment flap 125. The purpose of the first bungee 141 is to secure objects to the exterior of the invention 100.

Figure 6:
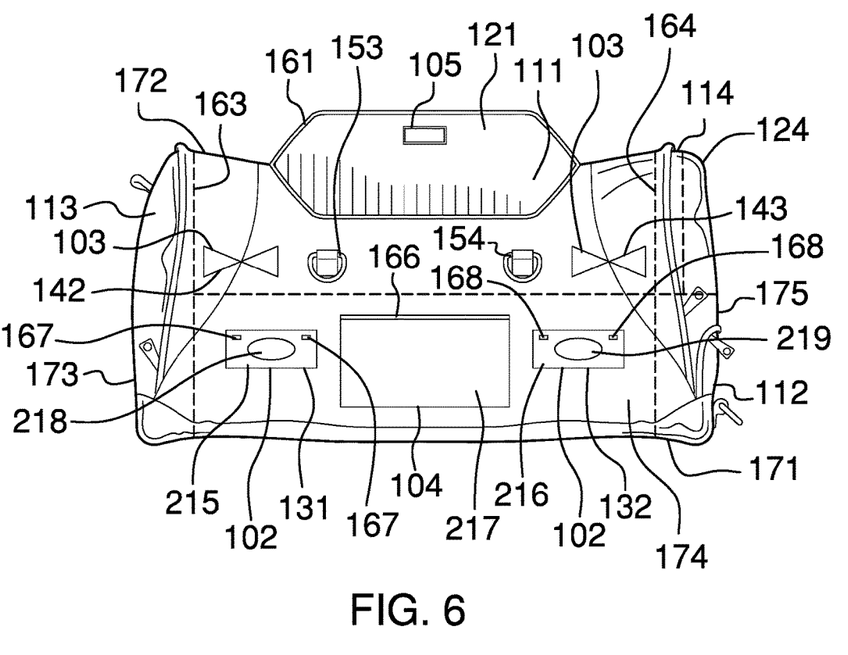
FIG. 6 is a side view of an embodiment of the disclosure.
Figure 7:
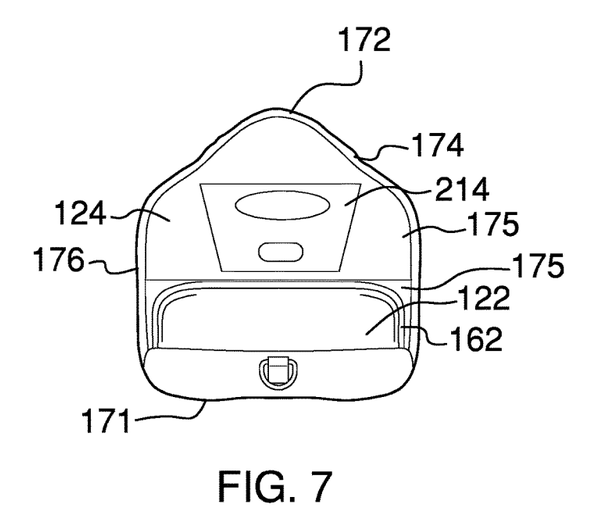
FIG. 7 is a side view of an embodiment of the disclosure.
Figure 8:
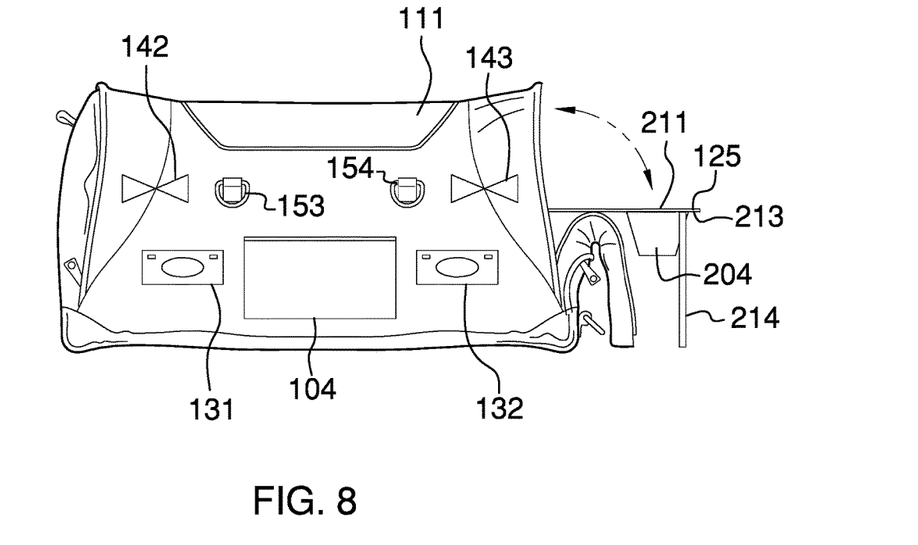
FIG. 8 is a side view of an embodiment of the disclosure.
Figure 9:
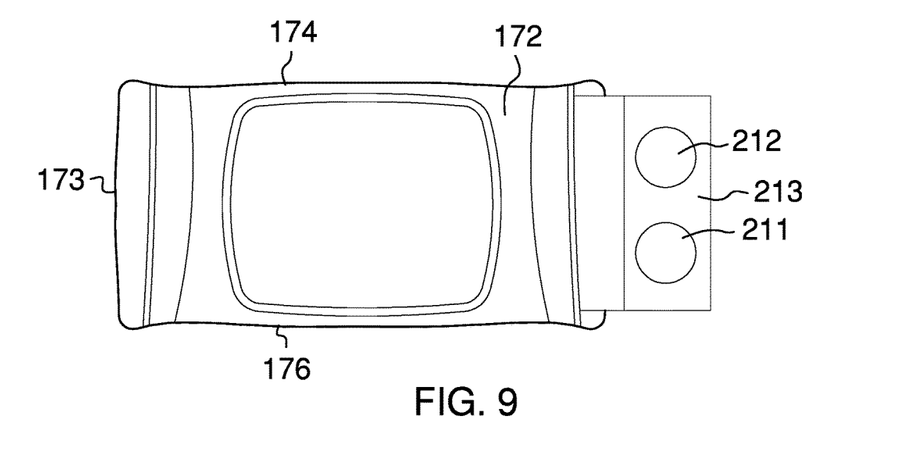
FIG. 9 is a top view of an embodiment of the disclosure.
Figure 10:
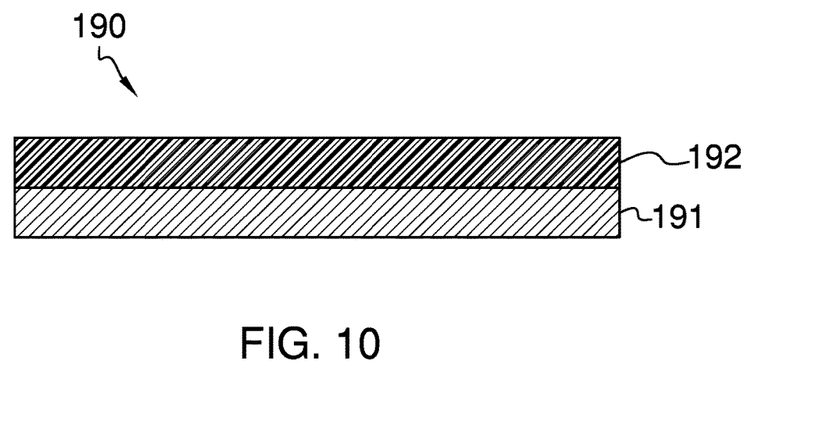
FIG. 10 is a detail view of an embodiment of the disclosure.

The one or more bungees 103 further comprises a second bungee 142 and a third bungee 143. As shown in FIGS. 6 and 8, the second bungee 142 and the third bungee 143 are attached to the document side 174 of the invention 100 for the purpose of securing objects to the exterior of the invention 100.

The plurality of D rings 107 further comprises a third D ring 153 and a fourth D ring 154. As shown in FIGS. 6 and 8, the third D ring 153 and the fourth D ring 154 are structural loops that are attached to the document side 174 of the invention 100 for the purpose of securing objects to the exterior of the invention 100.

The materials and assemblies used in the first potential embodiment of the disclosure are detailed in this paragraph. The exteriors surfaces are formed from a commercially available ballistic nylon textile. The interior surfaces of the invention 100 are formed form a commercially available plastic sheeting 192. The first fastener 161, the second fastener 162, the third fastener 163, the fourth fastener 164, the fifth fastener 165, and the sixth fastener 166 are readily and commercially available zippers. The seventh fastener 167 and the eighth fastener 168 are readily and commercially available hook and loop fasteners. The methods and techniques to assemble the luggage in the manner described in this disclosure are well known and documented in the textile arts.

The following definitions were used in this disclosure:

Bungee: As used in this disclosure, the term bungee refers to an elastic cord or a plurality of elastic cords.

Carabiner: As used in this disclosure, a carabiner is coupling link that is usually formed as an oblong metal ring with one spring hinged side that is used to open and close the ring. Synonyms for carabiner include D-link.

Cord: As used in this disclosure, a cord is a long, thin, and flexible piece of string, line, or rope. Cords are made from yarns, piles, or strands of material that are braided or twisted together or from a monofilament (such as fishing line). Cords have tensile strength but are too flexible to provide compressive strength and are not suitable for use in pushing objects. String, line, and rope are synonyms for cord.

Elastic: As used in this disclosure, an elastic is a material or object that deforms when a force is applied to it and that is able to return to its original shape after the force is removed. A material that exhibits these qualities is also referred to as an elastomeric material.

Elastic Cord: As used in this disclosure, an elastic cord is a cord that contains elastic yarns as some of the yarns that make up the cord. An elastic cord is constructed such that the elastic cord will stretch when a force is applied and will return to its original shape when after the force is removed. Shock cord is a synonym for elastic cord.

Elastic Yarn: As used in this disclosure, an elastic yarn is a yarn formed from elastomeric materials.

Exterior: As used in this disclosure, the exterior is use as a relational term that implies that an object is not contained within the boundary of a structure or a space.

Fastener: As used in this disclosure, a fastener is a device that is used to join or affix two objects. Fasteners generally comprise a first element, which is attached to the first object and a second element which is attached to the second object such that the first element and the second element join to affix the first object and the second object.

Flap: As used in this disclosure, a flap is a piece of material that is hinged or otherwise attached to a surface using one side such that the piece of material hangs in such a way as to cover a hole in the surface.

Handle: As used in this disclosure, a handle is an object by which a tool, object, or door is held or manipulated with the hand.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Interior: As used in this disclosure, the interior is use as a relational term that implies that an object is contained within the boundary of a structure or a space.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Pocket: As used in this disclosure, a pocket is a storage space that is formed into an object.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as cloth, plastic, or metal foils, in the form of a thin flexible layer or layers.

Strap: As used in this disclosure a strap is a strip of leather, cloth, or other flexible material, often with a buckle, that is used to fasten, secure, carry, or hold onto something.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

Wet Wipe: As used in this disclosure, a wet wipe is a paper or textile is that previously moistened and that is used for cleaning purposes. By previously moistened is meant that the paper or textile is moistened before the wet wipe is packaged for storage. These previously moistened papers or textiles will remain moist until subsequent accessed. The previously moistened paper or textile can be individually wrapped for storage or can be stored in bulk.

Zipper: As used in this disclosure, a zipper is a fastening device comprising two flexible strips with interlocking components that are opened and closed by pulling a slide along the two flexible strips.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A luggage item comprising:
  a plurality of compartments, a plurality of dispensers, one or more bungees, a document envelope, a picture frame, a plurality of fasteners, a plurality of D rings, a handle, and a strap;
  wherein the plurality of fasteners open and close the plurality of compartments;
  wherein the plurality of dispensers, the one or more bungees, the document envelope, the plurality of fasteners, the plurality of D rings, the handle, and the strap are attached to an exterior of the plurality of compartments;
  wherein the picture frame is mounted within a compartment selected from the plurality of compartments;
  wherein the luggage item is adapted for use with a domestic animal;
  wherein the luggage item stores one or more items adapted for use in the care of the domestic animal;

wherein the luggage item is further defined with a bottom side, a top side, a food side, a document side, a bed side, and an accessory side;
wherein the plurality of fasteners comprises a first fastener, a second fastener, a third fastener, a fourth fastener, a fifth fastener, a sixth fastener, a seventh fastener, and an eighth fastener;
wherein each of the plurality of compartments are positioned and attached to each other such that in total the plurality of compartments forms a unified item of luggage that is the luggage item;
wherein walls of the plurality of compartments comprise a plurality of composite textiles
wherein each of the plurality of composite textiles comprises a two layer composite textile that is formed from textile and a plastic sheeting;
wherein each of the plurality of compartments is formed from a combination comprising one or more composite textiles;
wherein each of the plurality of compartments is formed in such a manner that exterior surfaces of the luggage item are formed from the textile while the interior surfaces of the luggage item are formed from the plastic sheeting;
wherein the plurality of compartments comprises a master compartment, a bed compartment, a food storage compartment, a tray compartment, and an accessory compartment;
wherein the master compartment further comprises a master compartment flap and the first fastener;
wherein the bed compartment further comprises a bed compartment flap and the second fastener;
wherein the food storage compartment further comprises a food storage compartment flap and the third fastener;
wherein the tray compartment further comprises a tray compartment door and the fourth fastener;
wherein the accessory compartment further comprises an accessory compartment flap and the fifth fastener;
wherein the bed compartment is adapted for use with a bedding;
wherein the bed compartment is accessed through the bed side of the luggage item and is positioned proximal to the bottom side of the luggage item;
wherein the bed compartment flap is a first three sided cut that forms a first aperture through the exterior of the luggage item through which the bedding can be inserted;
wherein access to the bed compartment is gained through the bed compartment flap;
wherein the bed compartment flap is secured to the bed compartment using the second fastener in a fashion that closes access to the bed compartment;
wherein the tray compartment is adapted for use in storing and presenting bowls for use by the domestic animal;
wherein the tray compartment is accessed through the bed side of the luggage item;
wherein the tray compartment door is a second three sided cut that forms a second aperture through the exterior of the luggage item;
wherein access to the tray compartment is gained through the tray compartment door;
wherein the tray compartment door is secured to the tray compartment using the fourth fastener in a fashion that closes access to the tray compartment;
wherein the tray compartment door further comprises a first bowl aperture, a second bowl aperture, a reinforcing plate and a supporting strut;
wherein the tray compartment door is designed to provide a supporting surface;
wherein the reinforcing plate is a molded plastic plate;
wherein the reinforcing plate is attached to the fourth flap such that the reinforcing plate will form a horizontal surface when the tray compartment door is opened;
wherein the tray compartment door is held in a horizontal position by the supporting strut;
wherein the supporting strut is a plastic trapezoidal structure that is mounted on an exterior surface of the tray compartment door such that when the tray compartment door is opened to the horizontal position the supporting strut will swing perpendicular to the tray compartment door.

2. The luggage item according to claim 1
wherein the master compartment is a general storage compartment that is accessed through the top side of the luggage item;
wherein the master compartment flap is a third three sided cut that forms a third aperture through the exterior of the luggage item;
wherein access to the master compartment is gained through the master compartment flap;
wherein the master compartment flap is secured to the master compartment using the first fastener in a fashion that closes access to the master compartment.

3. The luggage item according to claim 2
wherein the food storage compartment is adapted for use with pet food and water;
wherein the food storage compartment is accessed through the food side of the luggage item;
wherein the food storage compartment flap is a fourth three sided cut that forms a fourth aperture through the exterior of the luggage item;
wherein access to the food storage compartment is gained through the food storage compartment flap;
wherein the food storage compartment flap is secured to the food storage compartment using the third fastener in a fashion that closes access to the food storage compartment.

4. The luggage item according to claim 3
wherein the accessory compartment is adapted for use with treats and other equipment or supplies;
wherein the accessory compartment is accessed through the accessory side of the luggage item;
wherein the accessory compartment flap is a fifth three sided cut that forms a fifth aperture through the exterior of the luggage item;
wherein access to the accessory compartment is gained through the accessory compartment flap;
wherein the accessory compartment flap is secured to the accessory compartment using the fifth fastener in a fashion that closes access to the accessory compartment.

5. The luggage item according to claim 4
wherein the plurality of dispensers comprises a first sheet dispenser and a second sheet dispenser;
wherein each of the plurality of dispensers is adapted to dispense one or more sheetings;
wherein each of the plurality of dispensers is attached to the document side of the luggage item.

6. The luggage item according to claim
wherein the first sheet dispenser comprises a first textile and the seventh fastener;
wherein the first textile is attached to the document side of the luggage item using a first plurality of sewn seams in such a manner that a first pocket is formed;

wherein the first pocket is opened and closed using the seventh fastener;

wherein the first textile has further formed in it a sixth aperture;

wherein the second sheet dispenser comprises a second textile and the eighth fastener;

wherein the second textile is attached to the document side of the luggage item using a second plurality of sewn seams in such a manner that a second pocket is formed;

wherein the second pocket is opened and closed using the eighth fastener;

wherein the second textile has further formed in it a seventh aperture;

wherein the one or more sheetings are dispensed through the sixth aperture;

wherein the one or more sheetings are dispensed through the seventh aperture.

7. The luggage item according to claim 6
wherein the document envelope comprises a third textile and the sixth fastener;

wherein the third textile is attached to the document side of the luggage item using a third plurality of sewn seams in such a manner that a third pocket is formed;

wherein the third pocket is opened and closed using the sixth fastener.

8. The luggage item according to claim 7 wherein the picture frame is a transparent pocket formed on the interior surface of the master compartment.

9. The luggage item according to claim
wherein the plurality of D rings comprises a first D ring and a second D ring;

wherein the first D ring is a structural loop that is attached to the food side of the luggage item;

wherein the second D ring is a structural loop that is attached to the bed side of the luggage item;

wherein the strap attaches to the first D ring and the second D ring.

10. The luggage item according to claim 9
wherein the strap comprises a webbing, a first clip, a second clip, a hand loop and a shoulder pad;

wherein the first clip attaches to a first end of the webbing;

wherein the hand loop is formed in the end of the webbing that is distal from the first end of the webbing;

wherein the second clip is a carabiner;

wherein the shoulder pad is a padded rectangular textile;

wherein the second clip attaches the hand loop of the strap to the first D ring;

wherein the first clip attaches the first end of the webbing to the second D ring.

11. The luggage item according to claim 10
wherein the one or more bungees comprises a first bungee;

wherein the first bungee is attached to the accessory compartment flap.

12. The luggage item according to claim 11
wherein the plurality of D rings further comprises a third D ring and a fourth D ring;

wherein the third D ring and the fourth D ring are structural loops that are attached to the exterior of the document side of the luggage item.

13. The luggage item according to claim 12
wherein the one or more bungees further comprises a second bungee and a third bungee;

wherein the second bungee and the third bungee are attached to the exterior of the document side of the luggage item.

14. The luggage item according to claim 13
wherein the first fastener, the second fastener, the third fastener, the fourth fastener, the fifth fastener, and the sixth fastener are zippers;

wherein the seventh fastener and the eighth fastener hook and loop fasteners.

* * * * *